(12) United States Patent
Marchetto (10) Patent No.: US 11,810,081 B2
(45) Date of Patent: Nov. 7, 2023

(54) METHOD AND SYSTEM FOR THE GENERATION OF USER-INITIATED FEDERATED IDENTITIES

(71) Applicant: Corner Banca SA, Lugano (CH)

(72) Inventor: Jarno Marchetto, Canobbio (CH)

(73) Assignee: Cornèr Banca SA, Lugano (CH)

( * ) Notice: Subject to any disclaimer, the term of this patent is extended or adjusted under 35 U.S.C. 154(b) by 157 days.

(21) Appl. No.: 16/298,435

(22) Filed: Mar. 11, 2019

(65) Prior Publication Data

US 2019/0279173 A1    Sep. 12, 2019

(30) Foreign Application Priority Data

Mar. 12, 2018 (CH) ..................... 00305/18

(51) Int. Cl.
*G06Q 20/00* (2012.01)
*G06Q 20/06* (2012.01)
(Continued)

(52) U.S. Cl.
CPC ......... *G06Q 20/0658* (2013.01); *G06Q 20/00* (2013.01); *G06Q 20/0855* (2013.01);
(Continued)

(58) Field of Classification Search
CPC . H04L 2209/38; H04L 9/0637; H04L 9/0643; H04L 9/3247; H04L 9/3236;
(Continued)

(56) References Cited

U.S. PATENT DOCUMENTS 9,749,140 B2    8/2017  Oberhauser et al.
10,594,719 B2*  3/2020  Jones ................. H04L 63/1433
(Continued)

FOREIGN PATENT DOCUMENTS

CA    3057161 A1 * 11/2018 ........... G06F 16/137
EP    2905739 A1    8/2015
(Continued)

OTHER PUBLICATIONS

Neela k. enhancement of data confidentiality and secure data transaction in cloud storage environment, Cluster computing, 2018, vol. 21 (1), p. 115-124, Article 115.*
(Continued)

*Primary Examiner* — Ilse I Immanuel
(74) *Attorney, Agent, or Firm* — Fish & Richardson P.C.

(57) ABSTRACT

A method for generating user-initiated federated identities, said method being characterized in that it comprises:
providing a plurality of electronic data sets (104) stored in one or more files (103) of an electronic memory (102) of a first entity (100) being an identity certification subject, each electronic data set (104) including identity information univocally pertaining to a respective second entity or subject (201);
accessing one electronic data set (104)
selecting (1001) a sub-set of identity information from the accessed electronic data set (104);
generating (1002) a digital asset file (302) containing the sub-set of identity information, wherein said step of selecting (1001) is performed either by the first or the second entity, said step of generation (1002) is performed after the step of selection (1001) and is performed by said first entity (100);
a subsequent step of automatic generation (1003) of an hash file (301) of said digital asset file (302), said step of generation of said hash file (301) being performed by an electronic computer (101) associated to the first entity (100) and accessing to said memory (102);
the method further comprises a step of automatic generation of a transaction (1004) with a third entity or subject (202) comprising the generation of an electronic message containing the hash file (301) and the digital asset file (302) or the digital asset file (302) and an evidence
(Continued)

of the hash file (301), wherein the electronic message is at least temporarily stored on said memory (102).

9 Claims, 2 Drawing Sheets

(51) Int. Cl.
| | |
|---|---|
| *G06Q 20/08* | (2012.01) |
| *G06Q 20/36* | (2012.01) |
| *G06Q 20/38* | (2012.01) |
| *G06Q 20/40* | (2012.01) |
| *H04L 9/06* | (2006.01) |
| *H04L 9/40* | (2022.01) |
| *H04L 9/32* | (2006.01) |
| *H04L 9/00* | (2022.01) |

(52) U.S. Cl.
CPC ..... *G06Q 20/3674* (2013.01); *G06Q 20/3823* (2013.01); *G06Q 20/405* (2013.01); *G06Q 20/4014* (2013.01); *H04L 9/0637* (2013.01); *H04L 9/0643* (2013.01); *H04L 9/3239* (2013.01); *H04L 9/3297* (2013.01); *H04L 63/105* (2013.01); *H04L 9/50* (2022.05); *H04L 2209/56* (2013.01)

(58) Field of Classification Search
CPC . H04L 2209/56; H04L 9/3297; H04L 63/102; H04L 63/105; H04L 9/3242; H04L 9/50; H04L 9/3239; G06Q 20/3827; G06Q 50/265; G06Q 20/38215; G06Q 20/4014; G06Q 20/3674; G06Q 20/0855; G06Q 2220/00; G06Q 20/3823
See application file for complete search history.

(56) References Cited

U.S. PATENT DOCUMENTS

| | | | |
|---|---|---|---|
| 10,924,264 | B2 | 2/2021 | Wilson et al. |
| 2017/0251025 | A1 | 8/2017 | Varley et al. |
| 2018/0101684 | A1* | 4/2018 | Murphy .................... H04L 9/30 |
| 2018/0248699 | A1* | 8/2018 | Andrade ............... H04L 9/0897 |

FOREIGN PATENT DOCUMENTS

| | | |
|---|---|---|
| JP | 6009521 B2 | 10/2016 |
| WO | WO 2017/006135 A1 | 1/2017 |
| WO | WO 2017/066715 A1 | 4/2017 |
| WO | WO 2017/090041 A1 | 6/2017 |

OTHER PUBLICATIONS

Search Report and Opinion from related application No. IT201800003461 dated Jul. 17, 2018; 7 pages.
Examination Report in Indian Appln. No. 201914007779, dated Apr. 20, 2022, 5 pages.

* cited by examiner

METHOD AND SYSTEM FOR THE GENERATION OF USER-INITIATED FEDERATED IDENTITIES

CLAIM OF PRIORITY

This application claims priority under 35 USC § 119 to Switzerland Application Serial No. 0030518, filed on Mar. 12, 2018, the entire contents of which are hereby incorporated by reference.

FIELD OF THE TECHNIQUE

The present disclosure belongs to the field of electronic verification of identities and in detail concerns a method for generating user-initiated federated identities.

The present disclosure further concerns a computer program product for performing generation of user-initiated federated identities.

The present disclosure further concerns a system for generating user-initiated federated identities.

BACKGROUND ART

Electronic and computer technology every day increases its introduction in the field of banking, issuance and management of credit and debit cards, and more in general the field of economic transactions.

In past, when the subjects involved in economic transaction were material, certification of identity was provided by reciprocal knowledge by subjects or at least by a verification of an identity document belonging to at least one of them. Such an operation, provided typically contextually with the economic transaction, provided a significant certainty of the identity of the subjects involved in the transaction itself. Although identity documents could be counterfeit, at the time transactions were performed by material subjects, this proof was considered sufficient.

With the dematerialization of the economic subjects involved in transactions, certification of identities has become more and more important provided that between two subjects involved in a fully electronic and remote transaction each of the subjects does neither know the other one nor have prompt means to verify the respective identities.

For example, remote electronic transactions may performed typically by means of a payment cards—credit cards typically, but also debit cards—that contain data of the holder, associated to an univocal number, that once transmitted to the seller of a good or more in general to a second subject involved in the transaction, allow the latter to have a proof of the identity of the first subject to which the card is associated.

This is possible since a bank or payment card issuer performs several checks and verifications on prospect customers before opening bank accounts or issuing payment cards, e.g. identity verification, AML checks, compliance checks, credit worthiness checks, address verification, phone number verification, family status verification (for private customers), organization structure and governance verification (for corporate customers), beneficial owner verification, that not only allow correct respect of regulations for issuing payment cards or opening banking accounts, but allow in future a check between data of the payment card and the data of the owner if so required and under certain regulations. In fact, such bank or payment card issuer gets evidence and/or stores a copy of documents related to its checks and verifications in its databases, archives and IT systems.

After checks and verifications, and before opening bank accounts or issuing payment cards, such bank or payment card issuer, based on applicable laws and regulations and its own policies, defines additional properties and sets additional data related to a customer, e.g. successful check and verification evidence, credit limit, account or card expiry date, account or card ownership, beneficial ownership.

During usage of bank accounts or issuing payment cards and operations procedures, bank or payment card issuer collects further information related to customer and his behavior, e.g. spending amounts, incoming payment original accounts, outgoing payment destination accounts, fund usage, merchant category, merchant location, and so on.

In addition, during the customer relationship lifecycle, bank or payment card issuer further updates existing information, e.g. credit worthiness, credit limits, compliance status, address, phone number, family status verification (for private customers), organization structure and governance (for corporate customers), . . . .

Also for preserving a certain privacy of the clients, not all the data relating to the bank-customer relationship can be provided or may be transmitted to an asking authority, especially if for economic transaction.

Furthermore, accessing data held by a bank or a payment card issuer is subject to regulations which are not constant. In fact, bank or payment card issuer checks and verifications can be based on several laws, regulations and rules, including specific country laws and regulations, industry regulations and rules, internal rules and procedures. These laws, rules and regulations and related checks and verifications, further than being dynamically adapted over time, for example a change in an existing law can require to integrate a new check or to set differently the threshold for that check, are also dependent on the country involved in the transaction. Therefore, rapid and flexible adaptation of identities verification for fast and/or fully electronic remote and/or automated transactions, becomes difficult to perform.

SCOPES

The scope of the present disclosure therefore is to provide a method, a computer program product and a system for verifying identities of subjects or entities involved in transactions without directly accessing the bank or payment card issuer electronic systems.

A further scope of the disclosure is to provide a method, a computer program product and a system that allow to let entities check the identity of another entity involved in a transaction without adaptation rendered compulsory by changes or adaptations in laws and regulations strictly referring to information provided by the bank or payment card issuer for transactions.

A further scope of the disclosure is to provide a method, a computer program product, and a system that can rely to an external electronic certified system to provide support for at least temporary storing electronic data of an entity involved in a transaction whose identity is was previously certified by the bank or payment card issuer.

A further scope of the disclosure is to provide a method, a computer program product and a system that can provide for letting the entity, whose identity has to be certified, to select among different thresholds of identity check while letting the entities that check its identity still be confident about certification of said identity.

A further scope of the disclosure is to provide a method, a computer program product and a system that can provide certified identity files that can be accessed by a plurality of electronic remote data processing systems and more than once.

A further scope of the disclosure is to provide a method, a computer program product and a system through which the entity that verifies said identity can rely on data provided by different certification entities.

SUMMARY

The object of the present disclosure whose features are presented in the following aspects allows to solve the above and further scopes.

Aspects hereinafter disclosed may be combined in any suitable form and may be further combined with one or more of the annexed claims or parts of the subsequent detailed description.

According to a first aspect it is herewith disclosed a method for generating user-initiated federated identities, said method being characterized in that it comprises:
- providing a plurality of electronic data sets (104) stored in one or more files (103) of an electronic memory (102) of a first entity (100) being an identity certification subject, each electronic data set (104) including identity information univocally pertaining to a respective second entity or subject (201);
- accessing one electronic data set (104);
- selecting (1001) a sub-set of identity information from the accessed electronic data set (104);
- generating (1002) a digital asset file (302) containing the sub-set of identity information, wherein said step of selecting (1001) is performed either by the first or the second entity, said step of generation (1002) is performed after the step of selection (1001) and is performed by said first entity (100);
- a subsequent step of automatic generation (1003) of a hash file (301) of said digital asset file (302), said step of generation of said hash file (301) being performed by an electronic computer (101) associated to the first entity (100) and accessing to said memory (102);
- the method further comprises a step of automatic generation of a transaction (1004) with a third entity or subject (202) comprising the generation of an electronic message containing the hash file (301) and the digital asset file (302) or the digital asset file (302) and an evidence of the hash file (301), wherein the electronic message is at least temporarily stored on said memory (102).

According to a second non-limiting aspect, depending on the first aspect, said electronic message containing the hash file (301) and the digital asset file (302), or the digital asset file (302) and an evidence of the hash file (301), is created by using at least part of the computation power of said first entity (100), in particular through the electronic computer (101) associated to or of the first entity (100).

According to a third non-limiting aspect, depending on the first or second aspect, providing the plurality of electronic data sets (104) comprises providing electronic access to said electronic data sets (104) to a set of electronic computers which is predefined, and limited, by the first entity (100), optionally wherein providing the plurality of electronic data sets (104) comprises providing electronic access to said electronic data sets (104) to only the electronic computer associated to or of the first entity (100).

It shall be noted that with the wording "electronic computer (101) associated to or of the first entity (100)" shall be meant any electronic computer or computing infrastructure, whose computing power may be concentrated or geographically distributed, which is, or is specifically configured to be, under the direct control of, optionally being dedicated to, the first entity (100), in such a way that the electronic resources, and in particular the electronic data sets (104) and the files (103) are accessible only by the electronic computer (101) itself, or through an authenticated access on the electronic computer (101), e.g. by an authenticated second entity (201).

Moreover, as per "dedicated" shall be meant that the electronic computation power shall not be shared with entities other that the first or, optionally, by the first and the second entity.

For the purposes of the present disclosure, as per "evidence" shall be meant an electronic data containing at least part of the social name of the first entity (100) or an electronic data pointing to the electronic computer (101) of the first entity (100) or a related electronic data, said related electronic data at least comprising a pointer or link to a website of the first entity (100) or an electronic signature of the first entity (100).

According to a fourth non-limiting aspect, the step of accessing one electronic data set (104) is performed directly by the second entity (201), optionally through an authentication process on said electronic computer (101).

According to a fifth non-limiting aspect, depending on said third aspect, selecting (1001) the sub-set of identity information from the accessed electronic data set (104) comprises an electronic selection of the sub-set of identity information being performed by the second entity (201), optionally only after a positive verification procedure of authentication performed by said electronic computer (101) in accordance to authentication data introduced by said second entity (201) for authenticating thereon.

According to a sixth non-limiting aspect, depending on one or more of the previous aspects, the generation of the transaction (1004) is performed by establishing an electronic communication channel with a decentralized or remote ledger (401).

According to a seventh non-limiting aspect, depending on the sixth aspect, said ledger (401) is a predetermined ledger comprising a blockchain, and wherein, after the establishing of the electronic communication channel, the first entity (100) automatically transmits or permanently affixes said hash file (302) on or to said ledger (401).

Preferably, albeit in a non-limiting extent, the blockchain may be, or may realize, a distributed, decentralized public ledger.

In particular, the first entity (100) automatically transmits or permanently affixes the hash file (302) on or to the ledger (401) by means of said electronic computer (101).

According to a eighth non-limiting aspect, depending on one or more of the previous aspects, said method further comprises a step of electronically generating a smart contract (402), said step being performed after the step of generation (1002) of the digital asset file (302) and after the step of generation (1003) of the hash file (301), wherein said smart contract (402) performs a remote selective distribution of said digital asset file (302) and/or of said hash file (301).

In particular, smart contracts may be electronic self-executing contracts with the terms of the agreement between buyer and seller being directly written into lines of code. The code and the agreements contained therein exist across a distributed, decentralized blockchain network. The buyer, or seller, may be the first entity, or the second entity as intended in the present disclosure.

According to an ninth non-limiting aspect, depending on the previous seventh or eighth aspect, the generation of the smart contract (402) is performed on said ledger (401), specifically on the blockchain.

According to a tenth non-limiting aspect, depending on one or more of previous aspects when depending on said sixth aspect, said ledger (401) is provided with inputs configured to receive predefined digital assets from entities other than said first entity (100) and second entity (201).

According to an eleventh non-limiting aspect, depending on said tenth aspect, the ledger (401) is configured to perform iteratively a step of awaiting for reception of at least one digital asset on said input.

According to a twelfth non-limiting aspect, depending on one or more of the preceding aspects when depending on said eighth aspect, the selective distribution of said digital asset file (302) and/or of said hash file (301) is performed only after reception of an appropriate predefined digital asset from entities other than said first entity (100) and second entity (201).

According to a thirteenth non-limiting aspect, depending on one or more of the previous aspects, said hash file (301) and said digital asset file (302) are read-only.

For the purposes of the present disclosure, as per "read-only" shall be meant a file that once first written by an entity, in the context of the disclosure the first entity, cannot be modified by any other entity, optionally including said first entity.

According to a fourteenth non-limiting aspect, depending on one or more of the previous aspects, said method comprises a step of providing an electronic user interface for said second entity or user (201), said user interface being configured for at least allowing accessing said electronic computer (101) or said memory (102).

According to a fifteenth non-limiting aspect, depending on one or more of the previous aspects, said method comprises a step of electronically univocally associating said electronic data set (104) to a specific second entity (201) by a provision of predefined access credentials.

According to a sixteenth non-limiting aspect, depending on one or more of the previous aspects, said method further comprises a step of storing in said memory (102) a plurality of files (103) each one containing an exemplary of said electronic data set (104).

According to a seventeenth non-limiting aspect, depending on one or more of the previous aspects in combination with the fourteenth aspect, in said method the provision of an user interface allows said first entity to access to only electronic data set (104) electronically associated specifically to said first entity through an electronic comparison of said predefined access credentials.

According to a eighteenth non-limiting aspect, depending on one or more of the previous aspects in combination with the fourteenth aspect and/or the seventeenth aspect, the provision of an user interface allows said second entity to access to only electronic data set (104) stored in the respective file (103) electronically associated specifically to said second entity through a comparison of said predefined access credentials, while denying any electronic access at least for reading of other files (103) electronically associated to entities other said second entity (201).

According to a nineteenth non-limiting aspect, depending on one or more of the previous aspects in combination with the fourteenth aspect and/or the seventeenth or eighteenth aspect, said provision of a user interface allows said second entity (201) to electronically perform at least said step of selection (1001) of a sub-set of an electronic data set (104).

According to a twentieth non-limiting aspect, depending on one or more of the previous aspects in combination with the fourteenth and/or seventeenth and/or eighteenth and/or nineteenth aspect, said provision of an user interface is performed through an electronic secure communication channel established and kept for the time necessary at least to perform said step of selection (1001) of said sub-set of electronic data set (104).

According to a twenty-first non-limiting aspect, depending on said twentieth and fifteenth aspect included aspects depending thereto, said electronic secure communication channel is established after a positive electronic comparison of access credentials inputted by the second entity (201) with a access credentials stored in the memory (102) or in the electronic computer (101) of said first entity (101), and is established between said electronic computer (101) and a computing system (501) or electronic mobile device (502) remotely connected to said electronic computer (101) and/or to said memory (102) and belonging to said second entity (201).

According to a twenty-second non-limiting aspect, depending on said nineteenth aspect or on any other aspect depending thereon, said user interface is provided through a web-based application, or a mobile application or a chatbot or an interactive intelligence phone system or, optionally, any future similar mechanism or interface.

According to a twenty-third non-limiting aspect, depending on one or more of the previous aspects, said sub-set of data of said electronic data set (104) is modifiable only by said second entity (201) by securely electronically accessing said memory (102) and/or said electronic computer (101).

According to a twenty-fourth non-limiting aspect, depending on said sixteenth and twenty-third aspect, said electronically accessing is performed through transmission of said access credentials.

According to a twenty-fifth non-limiting aspect, depending on one or more of the preceding aspects, said electronic data set (104) is modifiable only by said first entity (100).

According to a twenty-sixth non-limiting aspect, depending on one or more of the preceding aspects, said method further comprises a step of identity verification (1007) by a third entity (202), wherein the identity verification (1007) allows to electronically check the actual claimed identity of said second entity (201) by electronically comparing data provided therefrom with said hash file (301) and said digital asset file (302).

According to a twenty-seventh non-limiting aspect, depending on said sixth and said twenty-sixth aspect, said comparison of data comprises accessing to the remote ledger (401) containing said hash file (301) and allowing fulfillment of the smart contract in case of compliance of data claimed of said second entity (201) with said hash file (301).

According to a twenty-eighth non-limiting aspect, depending on one or more of said previous aspects, said method further comprises a step of electronically storing in said memory (102) an electronic data set (104) on a file electronically associated to said second entity (201).

According to a twenty-ninth non-limiting aspect, depending on one or more of the previous aspects, said method further comprises a step of electronically attaching to said hash file (301) and/or to said digital asset file (302) a timestamp or certified electronic timing datum, providing information of at least the date on which said electronic data set (104) and/or said sub-set have been respectively created, updated or selected.

According to a thirtieth non-limiting aspect, depending on said twenty-ninth aspect, said certified electronic timing datum is a unmodifiable datum, only readable by at least said first entity (100) and/or second entity (201), electronically provided to said first entity (100) by a timing certification provider, optionally an external timing certification provider.

According to a further and thirty-first aspect, is herewith disclosed a computer program product, stored on a non-transitory media support, suitable to be executed on at least one data processing unit, said computer program product being configured to allow the execution of the steps of the method according to any one of the previous aspects.

According to a thirty-second aspect, depending on one or more of the previous aspects, the electronic data set (104) comprises at least one (and particularly a plurality) among the data here listed: name, surname, address, identity document number, issuing authority, AML checks, compliance checks, credit worthiness checks, address verification, phone number and its verification, family status, organization structure and governance verification, beneficial owner verification, social name, legal headquarter of a legal entity, administrative headquarter, facilities headquarters, subsidiaries, company type, stock capital amount, VAT number, registry of commerce number, fiscal number or code, names of persons with disjointed or co-jointed legal representation power within a company.

According to a further and thirty-third aspect, is herewith disclosed a system for generating user-initiated federated identities, said system comprising data processing unit configured to execute one or more of the steps according to aspects from the first to the thirtieth or thirty-second.

According to a further thirty-fourth and independent aspect is herewith disclosed a method for verifying user-initiated federated identities, said method comprising:
- a step of electronically accessing to a digital asset file (302) and to a hash file (301) provided by a first entity (100) being an identity certification subject and containing data associated and selected beforehand by a second entity (201);
- a step of retrieving and verifying identity of said second entity (201) through the digital asset file (302) and to the hash file (301) by electronically accessing to a ledger (401) providing certification of data stored or pointed thereby, said ledger (401) storing or pointing in a certified way to the digital asset file (302) and to the hash file (301) through a transaction initiated or executed by said first entity (100),
- wherein the step or retrieving and verifying the identity of the second entity (201) is configured for independently electronically perform:
- a comparison of identity data claimed by said second entity (201) with identity data stored in the digital asset file (302), and
- an identification of the issuing entity of data contained in the digital asset file (302) and in the hash file (301).

According to a thirty-fifth non-limiting aspect, dependent on the thirty-fourth aspect, said first issuing entity (100) has beforehand performed a step of issuance of the hash file (301) basing on data contained in the digital asset file (302) or basing on the digital asset file (302).

According to a thirty-sixth non-limiting aspect, depending on one or more of the thirty-fourth or thirty-fifth aspect, the digital asset file (302) contains a sub-set of data electronically selected by the second entity (201) among data of a read-only electronic data set stored in a memory (102) associated to or of the first entity (100).

According to a thirty-seventh non-limiting aspect, depending on one or more of the previous aspects from thirty-fourth to thirty-sixth, the step of retrieving and verifying the identity of the second entity (201) comprises a step of electronically accessing to said hash file (301) and extracting therefrom data concerning to or pointing to the first issuing entity (100).

According to a thirty-eighth non-limiting aspect, depending on one or more of the previous thirty-fourth to thirty-seventh aspect, the ledger (401) comprises a blockchain.

According to a thirty-ninth non-limiting aspect, depending on one or more of the previous aspects, the federated identity comprises data intrinsically related to data of a subject or entity and further digital assets, in particular wherein said digital assets comprise electronic certificates, in particular electronic and digitally secured certificates.

According to a fortieth non-limiting aspect, depending on said thirty-eighth aspect, said digital asset comprises electronic medium of exchange, wherein in particular said medium of exchange comprises electronic currencies and more in particular cryptocurrencies.

As per crypto-currencies may be intended any form of currency that only exists digitally, preferably with no central issuing or regulating authority but instead using a decentralized system to record transactions and manage the issuance of new units, and that relies on cryptography to prevent counterfeiting and fraudulent transactions.

According to a forty-first non-limiting aspect, depending on said thirty-fourth or thirty-fifth aspect or any further aspect if made dependent thereto, the digital asset file (302) contains a sub-set of data electronically selected by the second entity (201) among at least one, optionally a plurality of, electronic data set/s (104) whose access is predefined, and limited, to a set of electronic computers defined by the first entity (100), optionally wherein the access is predefined, and limited, to an electronic computers of or associated to said first entity (100).

According to a forty-second non-limiting aspect, depending on said depending on said forty-first aspect or any further aspect if made dependent thereto, the sub-set of data comprises read-only identity information being selected by the second entity (201) optionally only after a positive verification procedure of authentication performed by said electronic computer (101) in accordance to authentication data introduced by said second entity (201) for authenticating thereon.

According to a further, forty-third, aspect of the disclosure is herewith disclosed a distributed computing environment, comprising
- an electronic interface, controlled by said first entity (100), providing restricted access to a plurality of electronic data sets (104) stored in one or more files (103) of an electronic memory (102) of a first entity (100) being an identity certification subject, each electronic data set (104) including identity information univocally pertaining to a respective second entity or subject (201), and allowing accessing at least one electronic data set (104) and at least selecting (1001) a sub-set of identity information from the accessed electronic data set (104);
- a generating interface, controlled by said first entity (100), configured for generating (1002) a digital asset file (302) containing the sub-set of identity information after the action of selecting (1001) is performed either by the first or the second entity;
- a hashing generation controller, controlled by said first entity (100), operatively connected to said generating interface, configured for automatically generating (1003) a hash file (301) of said digital asset file (302), by accessing said memory (102);

a transaction generation controller, configured for generating a transaction (1004) with a third entity or subject (202), wherein said transaction comprises an electronic message containing the hash file (301) and the digital asset file (302) or the digital asset file (302) and an evidence of the hash file (301), wherein the electronic message is at least temporarily stored on said memory (102).

According to a forty-fourth non-limiting aspect, depending on said forty-third aspect, said restricted access is limited to an electronic computer (101) of, or associated to, the first entity (100).

According forty-fifth non-limiting aspect, the electronic interface, controlled by said first entity (100), providing restricted access to a plurality of electronic data sets (104), is configured to allow the second entity (201) access to at least one electronic data set (104) associated to a second entity (201) itself, optionally through an authentication process on said electronic computer (101).

According to a forty-sixth non-limiting aspect, depending on said forty-fifth aspect, the electronic interface is configured for allowing the second entity (201) select (1001) the sub-set of identity information from the electronic data set (104) accessed by said second entity (201), optionally only after a positive verification procedure of authentication performed by said electronic computer (101) in accordance to authentication data introduced by said second entity (201) for authenticating thereon.

According to a forty-seventh non-limiting aspect, depending on one or more of the previous aspects when made dependent on said forty-third aspect, the transaction generation controller is configured for establishing an electronic communication channel with a decentralized or remote ledger (401).

According to a forty-eighth non-limiting aspect, depending on the forty-sixth aspect, said ledger (401) is a predetermined ledger comprising a blockchain, and wherein, after the establishing of the electronic communication channel, the first entity (100) is configured for automatically transmitting or permanently affixing said hash file (302) on or to said ledger (401).

According to a forty-ninth non-limiting aspect, depending on one or more of the previous aspects when made dependent on said forty-third aspect, the distributed computing environment is configured for generating a smart contract (402), after the generation (1002) of the digital asset file (302) and after the generation (1003) of the hash file (301), wherein said smart contract (402) performs a remote selective distribution of said digital asset file (302) and/or of said hash file (301), and optionally, the generation of the smart contract (402) is performed on said ledger (401), specifically on the blockchain.

DESCRIPTION OF FIGURES

The aforementioned and other, further, aspects of the object of the disclosure will be described in at least one preferred and non-limiting embodiment with the support of the annexed figures wherein.

DETAILED DESCRIPTION

Figure 1:
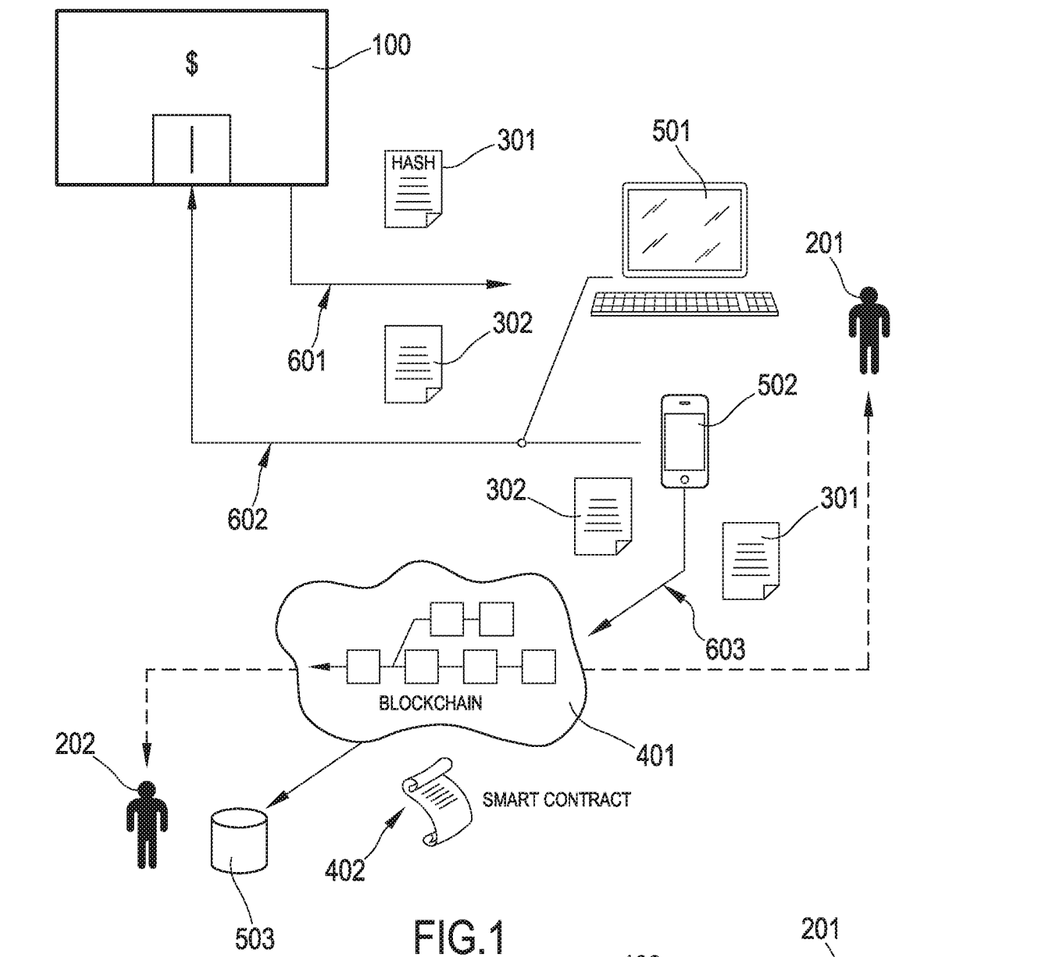
FIG. 1 shows a schematic diagram of a preferred embodiment of the object of disclosure.

FIG. 1 shows an overall schematic representation of a system for generating user-initiated federated identities. In particular the system object of the disclosure is conceived for generating user-initiated federated identities of at least one and preferably a plurality of subjects that hold a customer relationship with a bank or a payment card issuer 100 that in the context of the present description will be hereinafter designated as "first entity" 100. As well, those subjects will be referred as "second entities" provided that from the strict point of view of the system they appear as electronic systems although being human subjects and/or legal entities. Entities always possess an own identity.

In the context of the present disclosure, as per "identity" shall be meant a digital identity, i.e. the plurality of unique and essential characteristics of a subject that allow to identify it. In other words, the digital identity is the virtual representation of the real identity that can be used for electronic interactions with persons or machines.

As per "federated identities" shall be meant digital identities wherein the mechanism of single-sign-on (SSO) extends beyond the own organization, and through which a multiplicity of services provided by many different organizations can be accessed by using always the same credentials. As a further specification, it shall be noted that the wording "federated" is used as an indication that the identity is guaranteed by the first entity, as issuing entity, which in turn links the subject or entity as being a natural or legal person to its own identity and attributes. Although preferably the federated identity, as intended with the aforementioned meaning, is related to data intrinsically associated to the identity of a subject or entity, the federated identity may further comprise digital assets, as an electronic and preferentially secured certificate and/or medium of exchange comprising in turn an electronic currency, in particular at least one type of cryptocurrency.

Identities are herewith referred as "user-initiated" since the entities involved in the very first provision of personal and real identity data, and as well involved in the selection of which data among those already first provided are data to be selectively shared or distributed with other parties, are the subjects herein mentioned as second entities.

Figure 2:
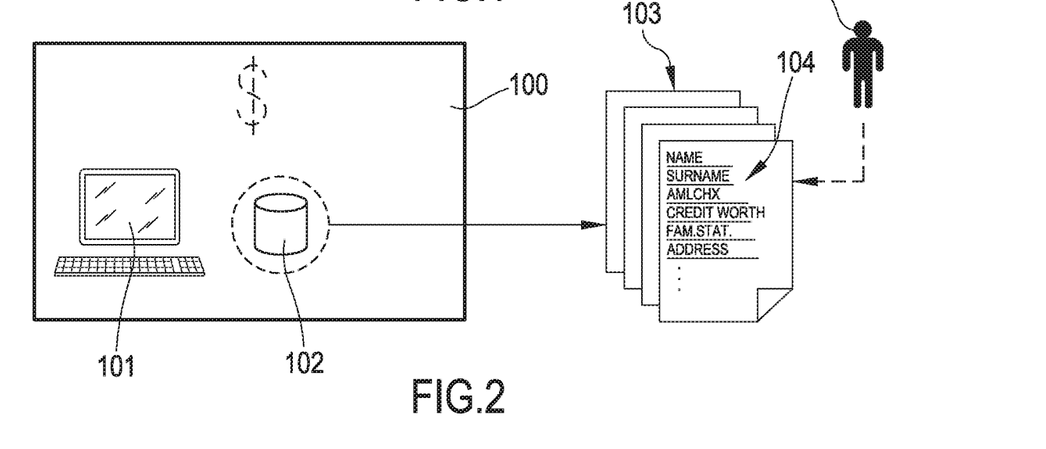
FIG. 2 shows a detail of a part of the embodiment of the disclosure.

As shown in FIG. 1 and in FIG. 2 the first entity 100 schematically represented as a bank building can establish an at least electronic temporary data connection with one and preferably more second entities 201 each one preferably provided with a respective data processor, e.g. a personal computer 501 or a personal mobile phone 502, who can interact with the first entity 100. Such an interaction, being an electronic data transfer interaction, is schematically represented by arrow 602.

The first entity 100 is provided with an own electronic computer 101 provided with a memory 102. Such a memory 102 although being located in the context of FIG. 2 within the building of the first entity 100 shall not be considered in limiting terms so installed provided that can equivalently be substituted by a distributed memory storage system whose physical disks may not be all located in the same close area. Preferably, but in a non-limiting extent, the memory 102 may be securely accessed only through the electronic computer 101. Through the electronic computer 101 and associated memory 102, and through the institution it represents and the client's data possessed, the first entity 100 acts actually as identity certification subject. Client's data possessed by the first entity will be referred as client's electronic data set.

Although referred as electronic computer 101, this computer shall not be interpreted for the purposes of the present description only as a single physical computer unit 101. Although this technical implementation is possible, electronic computer 101 may be intended as a multicomputer system, arranged in a distributed although private, or dedicated, environment or network, in which computation power is distributed among a plurality of (physical) computers each one provided with data processing units with one or more processors, to create a distributed computation unit.

As schematically shown in FIG. 2, memory 102 may be configured to store—preferably but in a non-limiting extent in a plurality of files 103—a plurality of data belonging to respective second entities 201; such data (one different set 104 for each second entity—bi-univocally linked) may comprise at least one among the data here listed: name, surname, address, identity document number, issuing authority, AML checks, compliance checks, credit worthiness checks, address verification, phone number and its verification, family status, organization structure and governance verification, beneficial owner verification. Should the second entity 201 be a legal person, other or additional electronic data that might be included in the files 103 may comprise at least one of the data provided in the following list: social name, legal headquarter of a legal entity, administrative headquarter, facilities headquarters, subsidiaries, company type, stock capital amount, VAT number, registry of commerce number, fiscal number or code, names of persons with disjointed or co-jointed legal representation power within a company. Such data create the electronic data set 104 for the specific client. Data sets 104 and files 103, for the purposes of the present disclosure, are preferably, albeit in a non-limiting extent, only accessible by the electronic computer 101 or by second entities 201 whose authentication credentials are positively verified by the electronic computer 101. Privacy of data is thereby guaranteed against fraudulent access by non-authorized entities.

During the prosecution of the relation present between the first entity 100 and the plurality of second entities 201, for each of the data already present in the files of the memory 102 may be further completed with additional data comprising spending amounts, and/or incoming payment original accounts, and/or outgoing payment destination accounts, and/or fund usage, and/or merchant category, and/or merchant location. Those additional data therefore are data related to the specific second entity 201 involved in the relationship with the first entity and his behavior.

Data already present in the memory 102 may be updated throughout the existence of the relation between the first entity 100 with the relevant second entities 201; such a data, e.g. credit worthiness, credit limits, compliance status, address, phone number, family status verification, or organization structure and governance may be updated but, in any case, the updating is only made possible through at least a confirmation of the first entity 100 upon request of update from the second entity 201. Provided that the second entity 201 has not right to modify its data on the respective file of the memory 102 purely on its own volition, data stored in the file for each of the second entities 201 will be hereinafter considered as a read-only data. As it is represented in the flow chart of FIG. 3, acquisition and update of clients' or second entities' data is represented by block 1000.

Each of the files stored in the memory 102 can be accessed, e.g. for checking purposes, by the first entity 100 even without any specific credential if read from the electronic computer 101 or any other computer associated to a protected internal network belonging to the first entity 100; outside the virtual perimeter created by the first entity 100 and its internal network or dedicated environment, the data stored in files 104 shall be rendered accessible to second entities 201 upon introduction of access credentials, typed or anyway inputted (e.g. biometric identification) for example through the personal computer 501 or the personal mobile phone 502. Access credential may contain a predefined combination of a username or identification code previously electronically attributed to the specific second entity 201 and a password selected by the second entity 201 and stored in the memory 102, or univocal identification data extracted from fingerprints or visual recognition provided by appropriate sensors which may be present on the personal computer 501 or personal mobile phone 502 of the second entity 201.

Applicant has further noticed that establishing the communication channel through the user interface between the personal computer 501 or the personal mobile phone 502 of the second entity 201 may be better protected if the so created communication channel is a secured communication channel, established and kept for the time necessary at least to perform any operation requested by the second entity 201.

Data processing unit included in the electronic computer 101 may be programmed to automatically detect the identity of the second entity 201 requesting data access, and to electronically compare the access credentials inputted therefrom with a copy thereof, stored in the memory 102. Upon positive comparison, second entity 201 will have the possibility to access and see all data related to his relation with the first entity 100 (and only this data); access will be denied to data related to other relations that other second entities already have with the first entity. In other words, the user interface, upon electronic verification of the access credentials, provides for letting the second entity 201 to access only the electronic data set 104 stored in the file 103 electronically associated specifically to the second entity 201, while denying any electronic access at least for reading other files 103 electronically associated to entities differing from the specific second entity.

Figure 3:
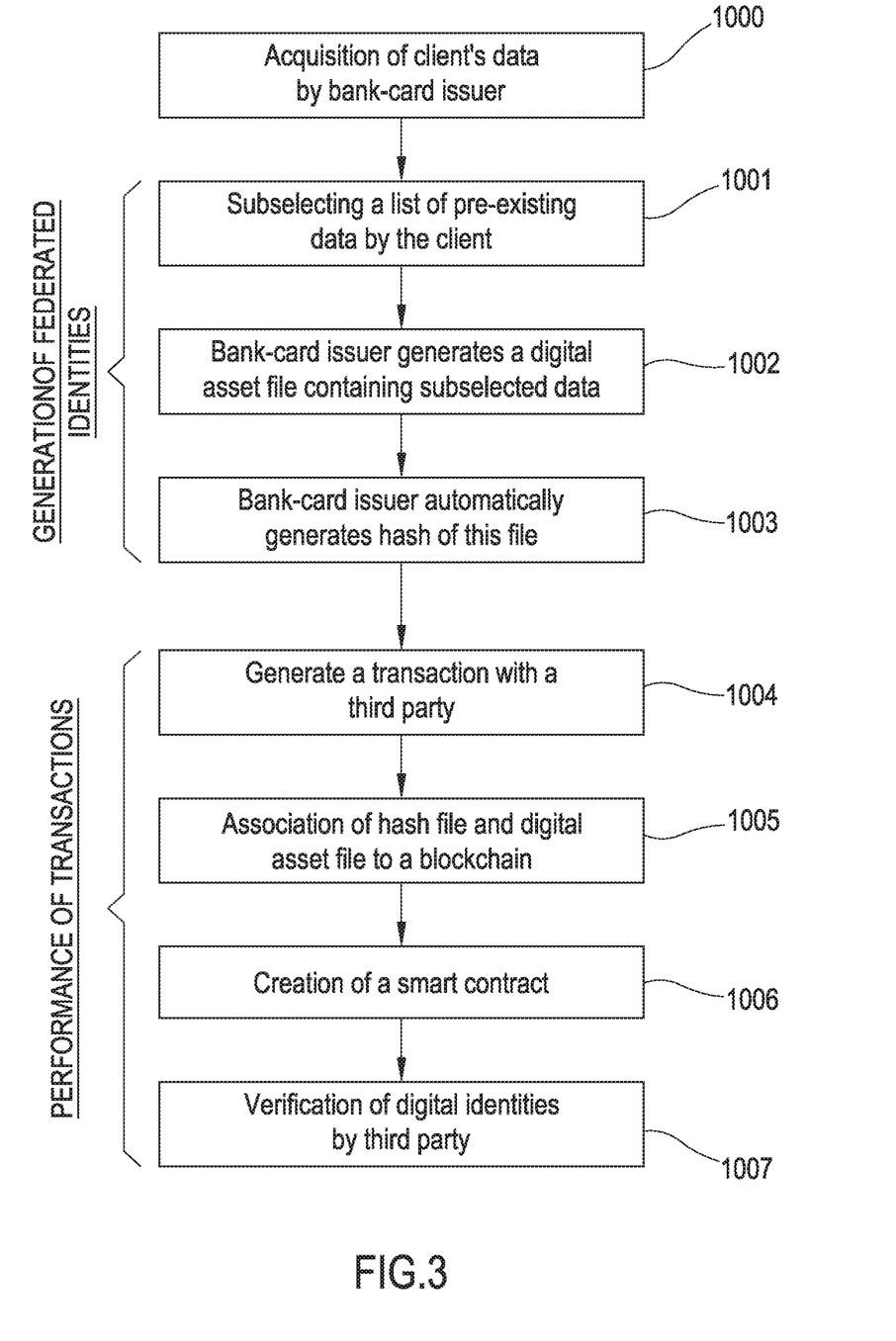
FIG. 3 shows a flow-chart of an example of method carried out for providing the federated identity of the disclosure.

In a general step of generation of federated identities, in particular user-initiated federated identities, through their personal computer 501 or personal mobile phone 502 with which access credentials are transmitted to the first entity 100, second entities 201 can access respective electronic data sets 104 stored in the memory 102 for selecting a sub-sets of identity information from the accessed data set. This operation is schematically represented in the diagram of FIG. 3 with block 1001. Substantially, through a user interface like a web-based application, or a mobile application, or an interactive intelligence phone system or a chatbot, any of the second entities 201 can select or pick some data among the entire data stored in the file 104 specifically associated thereto, as data to be used to further perform creation of a digital asset file 302 containing data of the interested second entity 201 wishing to selectively distribute it to further third entities for specific purposes. As per chatbot is meant a computer program simulating a conversation between a robot and a human subject, with the eventual purpose of convincingly simulating how a human—instead of the robot—would behave as a conversational partner. Selection of a sub-set of data may alternatively be performed directly through the electronic computer 101 of the first entity 100. If so created, the secured communication channel with the electronic computer 101 may be closed at first when the second entity 201 has fulfilled the selection of the aforementioned sub-set.

Further electronic accesses performed by the second entity 201 through his personal computer 501 or personal mobile device 502 allow to modify the sub-set of data, for altering selected data (i.e. selecting different sub-set, but not changing the content of any data, which is read-only), including further data originally contained in the electronic data set 104, or to remove originally selected data from the sub-selection.

Independently of the fact that the selection of the sub-set may be performed by the first entity 100 or the second entity 201, the creation of a digital asset file 302 (block 1002 in FIG. 3) is electronically performed at least through the computation provided the first entity 100 as certified issuing entity, although physical presentation of files may be actually performed by said personal computer 501 or personal mobile device 502 e.g. through a secured connection established with the computer; such a creation is performed automatically after the involved entity signals the completion of the selection of the sub-set of data. The so-created digital asset file 302 may be eventually transmitted to the personal computer 501 or to the personal mobile phone 502 of the specific second entity 201 that has performed the sub-selection, and such an operation is schematically represented in FIG. 1 by the arrow 601.

Digital asset file 302 may further contain extra data, and in particular it can include several information and data as per customer selection and user settings, including documents or additional assets as pictures, files, not originally stored in the file on the memory 102.

Subsequently, the first entity 100, through its electronic computer 101 or, as the case may be, the distributed computing environment of the first entity 100, automatically also performs generation (block 1003, FIG. 3) of a hash file 301 of the previously created digital asset file 302. This is preferably done by a hardware or software hashing generation controller operatively connected to the electronic interface that allows the creation of the digital asset file 302. Technically, the creation of the hash file comprises loading the previously created digital asset file 302 in the memory of the electronic computer 101, and providing data therein contained to a predefined hash function, preferably being a unidirectional function, to provide an electronic output data, technically named digest, substantially corresponding to the hash file 301. The hashing function of the hashing algorithm may be a non-invertible function.

Preferably, but in a non-limiting extent, the electronic computer 101, together with the creation of the digital asset file 302 and the respective hash file 301 may also create a timestamp appended either to the digital asset file 302 or to the hash file 301 or to both of them. A timestamp, technically equivalent to a certified electronic timing datum, makes it possible to exactly identify the point in time when such digital asset file 302, and/or the hash file 301, has been created and consequently when makes it possible to exactly identify when related information and data have been considered, i.e., the digital asset file is a static representation of the customer at a given time, and can dynamically change over time, i.e. providing at least the date on which said electronic data set 104 and/or said sub-set have been respectively created, updated or selected. Timestamp may be provided through the internal clock of the electronic computer 101 of the first entity or by the electronic computer 101 through a synchronization with a third entity diffusing date and time data, for example through a net time protocol.

The hash of the digital asset file 302 ensures that the related electronic file is authentic and has not been altered. This hash value is then made available to the customer and to any authorized third party, including smart contracts as autonomous escrow agents, as per user settings. Smart contracts are electronic self-executing contracts with the terms of the agreement between buyer and seller being directly written into lines of code. The code and the agreements contained therein exist across a distributed, decentralized blockchain network.

Moreover, the same hash value is used to permanently fix on a selected blockchain a proof of existence of the digital assets.

Once the hash is computed, bank or payment card issuer executes a transaction on a blockchain (i.e. a distributed ledger) and includes the hash value in that transaction. Any public or private blockchain can be used for this purpose. Any user that has access to the digital asset (electronic file) and to the blockchain on which the hash value has been fixed, can independently verify the authenticity of such digital asset. This action is generally represented in FIG. 3 by blocks 1004-1007 under the bracket "performance of transactions".

More in detail, after the hash file 301 has been created, the first entity 100 through its electronic computer 101 performs a step of automatic generation of a transaction (block 1004, FIG. 3) with a third entity or subject 202 in turn provided with an electronic computer with associated memory 503, through the creation of a message 603 containing the hash file 301 and the digital asset file 302 or the digital asset file 302 and an evidence of the hash file 301. Effective creation of the message may be performed directly through the electronic computer 101 or, as represented in FIG. 1, through the computation power of the personal computer 501 or personal mobile phone 502 of the second entity 201.

As per "evidence", it is herewith meant electronic data containing a certification of the social name of the first entity 100, or an electronic data pointing to the electronic computer 101 of the first entity 100 or a related electronic data comprising pointers or links to websites of the first entity or an electronic signature thereof.

As schematically depicted in FIG. 1, the transaction is performed through a decentralized or remote ledger 401, in particular a predetermined decentralized or remote ledger 401 to which at least the hash file 301 is permanently transmitted or affixed. The ledger 401 is in particular a predetermined blockchain.

A blockchain is an electronic and dynamically growing list of blocks (records) reciprocally connected in cascade and rendered intrinsically secured by means of a cryptography, wherein each block of the chain contains a hash pointer to the previous (parent) block, a timestamp and data of a transaction.

Affixing or transmitting the hash file 301 to the blockchain means electronically associating the hash file 301 to the blockchain for the purpose of rendering independently verifiable the origin of the digital asset file 302, origin being certified by the first entity 100 through the hash file, and the underlying identity. Blockchain technology ensures that information is decentralized and immutable, but at the same time potentially open to any user. Therefore, any authorized third party 202 that wants to verify customer identity and related data and information does not need access to bank or payment card issuer systems or to any third party centralized systems. Information derived from the blockchain transaction can be made directly available to the customer or to any authorized third party, including smart contracts. In particular, any public or private blockchain can be used for this purpose.

The advantage in using a blockchain as a support for the hash file 301 resides in that through the blockchain technology information therein contained or pointed or affixed, namely the hash file 301, is decentralized and immutable while being at the same time potentially open to be read by any user. This means that any authorized third party wanting to verify customer identity and related data and information, does not need to access the electronic computer 101 of the first entity 100 or, more generally, does not need to access the computer infrastructure of the first entity 100 or any third party centralized system.

The first entity 100 may therefore create a smart contract, electronically associated to the digital asset file 302 and to the hash file 301 of a predetermined second entity 201. As per "smart contract" shall be meant a computer protocol intended to electronically verify, facilitate or enforce the negotiation or performance of a contract. When a smart contract 402 (block 1006, FIG. 3) is created, such a smart contract 402 is electronically associated to the blockchain 401.

For letting the second entity 201 be free from manual sharing its data, specifically data of the digital asset file 302 and related hash file 301 with third parties, smart contracts 402 may provide for executing a remote selective distribution of the digital asset file 302 and/or of the hash file 301, that allow for restricting the target of third entities that can have electronic access to those files; technically speaking, the smart contract may contain protocols of automatic or autonomous sharing of data contained in the digital asset file 302 and/or hash file 301 with a requesting third party. Such a protocol of automatic or autonomous sharing of data, may comprise for example electronic subroutines of limitation of sharing for data contained in the digital asset file, that allow to share data contained in the digital asset file 302 and/or hash file 301 only to third parties 202 previously authorized to read that data by third party, or based on pre-defined conditions that have to be fulfilled.

For this purpose the blockchain may be provided with a virtual input port configured for receiving a predefined digital asset transmitted by entities different from the first entity 100 or the second entity 201. Such a digital asset is technically named "token"; blockchain can be figured as performing iteratively a step of awaiting for reception of an appropriate digital asset on its input, in a sort of repetitive idling process, whose termination takes place when an appropriate token is received.

After appropriate token (i.e. an electronic token issued and transmitted by an entity and which allows for authorizing and/or a service) is received by the blockchain, a selective distribution of the digital asset file 302 and/or of the hash file 301 may take place and is then subsequently and automatically performed. Any third party 202, through its personal computer, computer network or any other suitable electronic device may perform an electronic identity verification with which identity claimed by a second entity 201 is electronically checked. Data provided by the second entity 201, i.e. the hash file 301 and the digital asset file 302 are compared with identity claimed by the second entity 201, through an electronic access to the blockchain wherein the above files are stored. Such an access is performed by the third entity 202. In case of compliance of data claimed by the second entity 201 with the hash file 302 and the digital asset file 301, fulfillment of the smart contract may be performed.

More in detail, the method for verifying user-initiated federated identities first comprises electronically accessing to the digital asset file 302 and to the hash file 301 provided by a first entity 100 being an identity certification subject and containing data associated and selected beforehand by the second entity 201. In such a way, the user (third entity) that accesses the digital asset file 302 is provided with only a sub-set of personal information that the second entity 201 wants to share, e.g., and in a non-limiting extent, by means of a pointer or link to a server of the first entity wherein the data can be physically retrieved. Thereby privacy for the second entity and limitation of personal data which may be accessed by third parties is therefore respected. The hash file can provide proof that the authority issuing the data, i.e. the first entity 100, is actually the first entity it claims to be, and no fraudulent claim is present. In this sense, the third entity 202 performs a step of retrieving and verifying identity of the second entity 201 through the digital asset file 302 and to the hash file 301 by electronically accessing to the ledger 401, which in turn provides certification of data stored or pointed thereby. The aforementioned step may be performed automatically, without specific voluntary action of the third entity; a specific software or subroutine may be configured to perform the aforementioned step. It is herewith recalled that ledger 401 stores or points in a certified way to the digital asset file 302 and to the hash file 301 through a transaction initiated or executed by said first issuing entity 100.

The retrieving and verifying the identity of the second entity 201 is made through a comparison of identity data claimed by the second entity 201 with identity data stored in the digital asset file 302 and an identification of the issuing entity of data contained in the digital asset file 302 and in the hash file 301.

For performing the method of verifying the user-initiated federated identities it is requested that the issuing entity 100 has beforehand performed issuance of the hash file 301 basing on data contained in the digital asset file 302 or basing on the digital asset file 302.

During retrieving and verification of the identity of the second entity 201, the third entity 202, through its electronic computer, electronically accesses said hash file 301 and extracts therefrom data concerning to or pointing to the first issuing entity 100.

Through the method above described, any third entity 202 can rely on the data read from the files provided by the second entity 201, provided that there is trust in the subject (the first entity 100) who guarantees the identity of the second entity 201 without the need to access directly to the computer resources of the first entity 100. As well, management of privacy is eased, since the second entity 201 can freely choose the amount of personal data to be provided to reading entities other than the first one. Furthermore, the second entity 201 is freed from giving its own credentials to third parties, and as well freed from providing storage or reminding of who are the subject that provide the identity.

In the previous part of the description it was recited the presence of a distributed although private, or dedicated, environment. In a non-limiting embodiment, such an environment may comprise an electronic interface, controlled by the first entity 100, in particular directly controlled by the first entity, providing restricted access to a plurality of electronic data sets 104 stored in one or more files 103 of an electronic memory 102 of a first entity 100 being an identity certification subject, each electronic data set 104 including identity information univocally pertaining to a respective second entity or subject 201, and allowing accessing at least one electronic data set 104 and at least selecting (block 1001) a sub-set of identity information from the accessed electronic data set 104; preferably such interface may be a software interface, or a mixed software/hardware interface.

The distributed computing environment further provides a generating interface, controlled by said first entity 100, in particular directly controlled by the first entity, configured for generating (block 1002) a digital asset file 302 containing the sub-set of identity information after the action of selecting (block 1001) is performed either by the first or the second entity.

Moreover, the distributed computing environment provides a hashing generation controller, controlled by said first entity 100, in particular directly controlled thereby, operatively connected to said generating interface, configured for automatically generating (block 1003) a hash file 301 of the digital asset file 302, by accessing the memory 102.

The distributed computing environment further comprises a transaction generation controller, configured for generating a transaction (block 1004) with a third entity or subject 202, wherein said transaction comprises an electronic message containing the hash file 301 and the digital asset file 302 or the digital asset file 302 and an evidence of the hash file 301, wherein the electronic message is at least temporarily stored on said memory 102.

The restricted access which is referred above, in a particular embodiment is limited to the electronic computer 101 of, or associated to, the first entity 100. Privacy of the user is thereby safeguarded.

Moreover, the electronic interface controlled by the first entity 100 and providing restricted access to the plurality of electronic data sets 104, is configured to allow the second entity 201 access to at least one electronic data set 104 associated to a second entity 201 itself, optionally through an authentication process on said electronic computer 101. In particular, the electronic interface is configured for allowing the second entity 201 select (block 1001) the sub-set of identity information from the electronic data set 104 accessed by said second entity 201, optionally only after a positive verification procedure of authentication performed by the electronic computer 101 in accordance to authentication data introduced by said second entity 201 for authenticating thereon. The authentication data may be a couple (username-password) or may comprise a confirmation code which the user transmits to the electronic computer 101 after having been randomly selected by the computer 101 itself and transmitted to a portable device of the user.

The transaction generation controller of the first entity is configured for establishing an electronic communication channel with a decentralized or remote ledger 401, which—as yet above stated—is a predetermined ledger comprising a blockchain; once the electronic communication channel is established, the first entity 100 automatically transmits or permanently affixes the hash file 302 on or to said ledger 401. In such a way the distributed computing environment is configured for generating a smart contract 402, after the generation (block 1002) of the digital asset file 302 and after the generation (block 1003) of the hash file 301, in such a way that said smart contract 402 performs a remote selective distribution of the digital asset file 302 and/or of the hash file 301. The generation of the smart contract 402 is performed on the ledger 401, specifically on the blockchain.

Many parts of the steps performed in the method above disclosed may be performed by a computer program product, or software, which is stored in a non-transitional memory support suitable to be read by a data processing unit, namely the data processing unit of the electronic computer 101 of the first entity. As well, all the electronic devices involved in the method above described define a system for generating user-initiated federated identities.

The embodiment/s illustrated in the drawings are non-limiting. Accordingly, it should be understood that where features mentioned in the appended claims are followed by reference signs, such signs are included solely for the purpose of enhancing the intelligibility of the claims and are in no way limiting on the scope of the claims.

It is finally clear that further adaptations and additions can be brought to the object of the disclosure, without for this departing from the scope of protection provided by the annexed claims.

The invention claimed is:

1. A method for generating user-initiated federated identities, said method comprising:
   storing a plurality of electronic identity data sets in one or more files of an electronic memory of a first entity being an identity certification subject and being a bank or a payment card issuer, each electronic data set including identity information univocally pertaining to a respective second entity being a subject or a legal entity and differing from said first entity;
   accessing one electronic data set that univocally pertains to a particular second entity;
   selecting, performed by the first entity or the particular second entity, a subset of said identity information stored in the one electronic data set and specified by the first entity or said particular second entity for a transaction between said particular second entity and a third entity differing from said first entity and from said particular second entity, and wherein the selection of the subset differs from subsets selected for other second entities and from other subsets selected for said particular second entity;
   generating, by the first entity, a digital asset file containing the selected subset of said identity information;
   subsequently automatically generating a hash file of said digital asset file, said step of generating said hash file being performed by an electronic computer of the first entity accessing said electronic memory; and
   automatically generating the transaction with the third entity comprising the generation of an identity verification electronic message containing the hash file and the digital asset file or containing the digital asset file and an evidence of the hash file, wherein the electronic message is at least temporarily stored on said electronic memory of said first entity, the generating the transaction comprising:
   transmitting, by the first entity, the hash file to a block chain;
   verifying the identity of said particular second entity, said verification being carried out by the third entity, and comprising accessing the block chain and electronically comparing data provided by said particular second entity with said hash file and said digital asset file;
   creating, by the first entity, a smart contract on the block chain that executes a contract between said particular second entity and the third entity upon said verification of the identity of said particular second entity by the third entity, and
   electronically attaching a timestamp or certified electronic timing datum to said hash file and to said digital asset file, said timestamp or certified electronic timing datum providing information of at least date on which said subset of said identity information has been created, updated or selected, said certified electronic timing datum is an unmodifiable datum, only readable by at least said first entity and/or particular second entity, electronically provided to said first entity by a timing certification provider, wherein the electronic message containing the hash file and the digital asset file, is created by the electronic computer of the first entity; and wherein said hash file and said digital asset file are read-only files.

2. The method according to claim 1, wherein said blockchain is provided with inputs, said inputs being configured to receive predefined digital assets from entities other than said first entity and said particular second entity and wherein the blockchain is configured to perform iteratively a step of awaiting for reception of at least one digital asset on said input.

3. The method according to claim 1, said method comprising a step of providing an electronic user interface for said particular second entity or user, said user interface being configured at least for allowing an access to said electronic computer or said memory.

4. The method according to claim 1, further comprising a step of electronically univocally associating said electronic data set to the particular second entity by a provision of predefined access credentials.

5. The method according to claim 4, wherein the provision of an electronic user interface allows said particular second entity access to only the electronic data set electronically associated specifically to said particular second entity through an electronic comparison of said predefined access credentials, said provision of the user interface allows said particular second entity to electronically perform at least said step of selecting a sub-set of an electronic data set.

6. The method according to claim 3, wherein the provision of the user interface is performed though an electronic secure communication channel established and kept for time required at least to perform said step of selecting said sub-set of electronic data set.

7. The method according to claim 1, wherein said electronic data set is modifiable only by said first entity or wherein said electronic data set is modifiable only through authorization of said first entity.

8. A method for generating user-initiated federated identities, said method comprising:

storing a plurality of electronic identity data sets in one or more files of an electronic memory of a first entity being an identity certification subject and being a bank or a payment card issuer, each electronic data set including identity information univocally pertaining to a respective second entity being a subject or a legal entity and differing from said first entity and provided by a respective plurality of second entities to the first entity;

accessing one electronic data set that univocally pertains to a particular second entity;

selecting, performed by the first entity or the particular second entity, a subset of said identity information stored in the one electronic data set and specified by the first entity or said particular second entity for a transaction between the particular second entity and a third entity differing from said first entity and from said particular second entity, and wherein the selection of the subset differs from subsets selected for other second entities and from other subsets selected for said particular second entity;

generating, by the first entity, a digital asset file containing the selected subset of said identity information;

subsequently automatically generating a hash file of said digital asset file, said step of generating said hash file being performed by an electronic computer of the first entity accessing said electronic memory; and automatically generating the transaction with the third entity-comprising the generation of an identity verification electronic message containing the hash file and the digital asset file, wherein the electronic message is at least temporarily stored on said electronic memory of said first entity, the generating the transaction comprising:

transmitting, by the first entity, the hash file to a block chain;

verifying the identity of said particular second entity, said verification being carried out by the third entity, and comprising accessing the blockchain and electronically comparing data provided by said particular second entity with said hash file and said digital asset file;

creating, by the first entity, a smart contract on the block chain that executes a contract between said particular second entity and the third entity upon said verification of the identity of said particular second entity by the third entity, and electronically attaching a timestamp or certified electronic timing datum to said hash file and to said digital asset file, said timestamp or certified electronic timing datum providing information of at least date on which said subset of said identity information has been created, updated or selected, said certified electronic timing datum is an unmodifiable datum, only readable by at least said first entity and/or said particular second entity, electronically provided to said first entity by a timing certification provider, wherein the electronic message containing the hash file and the digital asset file, is created by the electronic computer of the first entity; and wherein said hash file and said digital asset file are read-only files.

9. A method for generating user-initiated federated identities, said method comprising:

storing a plurality of electronic identity data sets in one or more files of an electronic memory of a first entity being an identity certification subject and being a bank or a payment card issuer, each electronic data set including identity information univocally pertaining to a respective second, each electronic data set including identity information univocally pertaining to a respective second entity being a subject or a legal entity and differing from said first entity and provided by a respective plurality of second entities to the first entity;

accessing one electronic data set that univocally pertains to a particular second entity;

selecting a subset of said identity information stored in the one electronic data set and specified by the first entity for a transaction between said particular second entity and a third entity differing from said first entity and from said particular second entity, the first entity receiving said subset of identity information, and wherein the selection of the subset differs from subsets selected for other second entities;

generating, by the first entity, a digital asset file containing the selected subset of said identity information;

subsequently automatically generating a hash file of said digital asset file, said step of generating said hash file being performed by an electronic computer of the first entity accessing said electronic memory; and automatically generating the transaction with the third entity comprising the generation of an identity verification electronic message containing the hash file and the digital asset file, wherein the electronic message is at least temporarily stored on said electronic memory of said first entity, the generating the transaction comprising:

transmitting, by the first entity, the hash file to a block chain;

verifying the identity of said particular second entity, said verification being carried out by the third entity, and comprising accessing the blockchain and electronically comparing data provided by said particular second entity with said hash file and said digital asset file;

creating, by the first entity, a smart contract on the block chain that executes a contract between said particular second entity and the third entity upon said verification of the identity of said particular second entity by the third entity, and electronically attaching a timestamp or certified electronic timing datum to said hash file and to said digital asset file, said timestamp or certified electronic timing datum providing information of at least date on which said subset of said identity information has been created, updated or selected, said certified electronic timing datum is an unmodifiable datum, only readable by at least said first entity and/or said particular second entity, electronically provided to said first entity by a timing certification provider, wherein the electronic message containing the hash file and the digital asset file, is created by the electronic computer of the first entity; and wherein said hash file and said digital asset file are read-only files.

* * * * *